United States Patent
Hoffman

[11] 3,883,214
[45] Mar. 15, 1975

[54] PROTECTIVE ANTI-REFLECTIVE COATINGS FOR ALKALI-METAL HALIDE OPTICAL COMPONENTS

[75] Inventor: Richard A. Hoffman, Export, Pa.

[73] Assignee: Westinghouse Electric Corporation, Pittsburgh, Pa.

[22] Filed: June 14, 1972

[21] Appl. No.: 262,869

[52] U.S. Cl. ............... 350/1; 117/33.3; 117/69; 117/106 R; 331/94.5; 350/2; 350/164; 350/165
[51] Int. Cl...... B32b 9/04; G02b 1/10; G02b 13/14
[58] Field of Search........... 117/33.3, 106 R, 43, 68, 117/69; 350/164, 165, 1, 2

[56] References Cited
UNITED STATES PATENTS

| | | | |
|---|---|---|---|
| 2,207,656 | 7/1940 | Cartwright | 117/124 B |
| 2,271,239 | 1/1942 | Vokes | 117/106 R |
| 2,281,474 | 4/1942 | Cartwright | 350/164 |
| 2,512,257 | 6/1950 | Pfand | 117/33.3 |
| 2,512,257 | 6/1950 | Pfund | 117/33.3 |
| 2,561,077 | 7/1951 | Tilton | 350/164 |
| 2,641,954 | 6/1953 | Scharf | 350/164 |
| 2,641,954 | 6/1953 | Scharf | 350/164 |
| 2,912,351 | 11/1959 | Danner | 117/33.3 |
| 2,932,592 | 4/1960 | Cameron | 117/33.3 |
| 3,063,867 | 11/1962 | Emery | 117/106 R |

OTHER PUBLICATIONS

Cox et al., "Two Layer Anti Reflection Coatings." In Vacuum, Vol. IV (4), October, 1954.

Boumeister, "Multi-layer Filters," 1963, Univ. of Rochester, pp. 20–21 through 20–35..

Heavens, "Multilayer Systems" in The Journal of Photographic Science, Vol. 4, 1956, pp. 21–24.

Heavens, "Optical Properties of Thin Films" in Reports on Progress in Physics, Vol. XXIII, (1960), pp. 42, 53, 60.

Chemical Abstracts, Vol. 74: 47937d, March, 1971.

*Primary Examiner*—William D. Martin
*Assistant Examiner*—William H. Schmidt
*Attorney, Agent, or Firm*—R. D. Fuerle

[57] ABSTRACT

Optical components for use at a particular wavelength are disclosed which comprise a substrate of singlecrystal alkali-metal halide coated with $CaF_2$ or $MgF_2$ to an optical thickness of about an odd multiple of a quarter of a wavelength. The coating acts as a moisture barrier and increases the transmission of the window. Better adherence and moisture protection is obtained if a layer of $As_2S_3$ or $Sb_2S_3$ about a multiple of a half wavelength in optical thickness is between the alkali-metal halide and the $CaF_2$ or $MgF_2$. Optical components which may be coated include windows and lenses. In one embodiment the optical components have a double coating on their circumferential edges. The windows of this invention may be used as laser windows.

13 Claims, 2 Drawing Figures 3,883,214

PROTECTIVE ANTI-REFLECTIVE COATINGS FOR ALKALI-METAL HALIDE OPTICAL COMPONENTS

BACKGROUND OF THE INVENTION

While glass, quartz, and most other transparent materials absorb at about 10.6 $\mu$m or less, alkalimetal halides, particularly sodium chloride, transmit, and therefore are used as laser windows for lasers operating at that wavelength such as a $CO_2$ laser. However, because the halides are very susceptible to attack by moisture, the windows must be kept in sealed containers with a dessicant when they are not in use. When they are used as laser windows dry nitrogen must be blown across the surface or the optical quality of the window will quickly be destroyed.

These procedures are an expense and a nuisance and only serve to delay the eventual destruction of the window. While there is obviously a great need for a protective coating on the windows, until now no one has been able to find a material which will protect the windows without decreasing their optical properties.

SUMMARY OF THE INVENTION

I have found that coatings of $CaF_2$ and $MgF_2$ will protect alkali-metal halide optical components from moisture and that additional moisture protection can be obtained if there is a layer of $As_2S_3$ or $Sb_2S_3$ in between the halide and the coating. The $CaF_2$ or $MgF_2$ coatings also increase the transmission, but the $As_2S_3$ or $Sb_2S_3$ layer may be used by itself if only moisture protection is desired.

The coated components may be left unprotected in moist environments without change. Moreover, the $CaF_2$ and $MgF_2$ coatings increase the transmission over uncoated sodium chloride.

The components can be made with a double coating on the edges which gives the edges additional protection. The component may be a laser window, a lens, a prism, etc.

DESCRIPTION OF THE INVENTION

Figure 1:
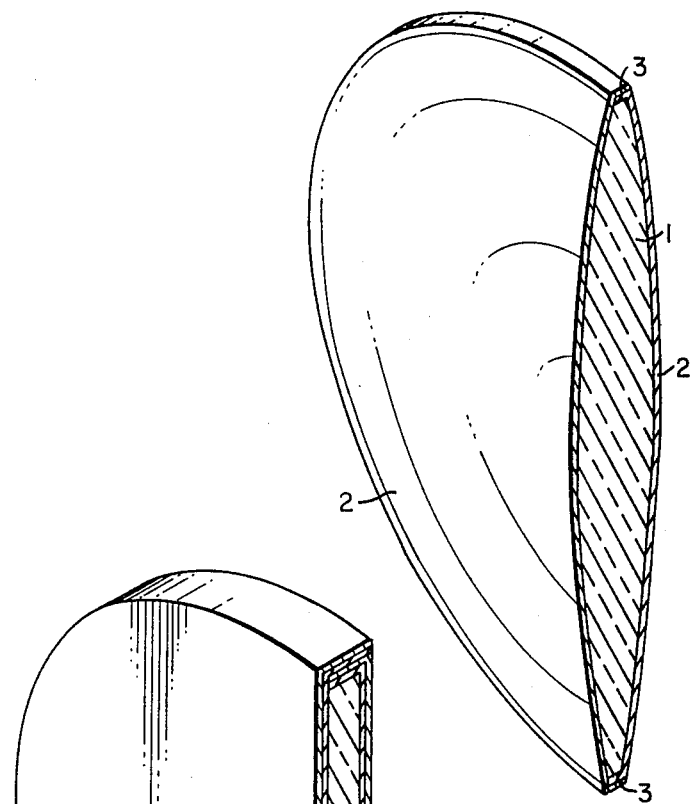
FIG. 1 is a sectional isometric view of a lens according to this invention.

In FIG. 1 a disk 1 of single-crystal alkalimetal halide has a coating 2 of $CaF_2$, or $MgF_2$, $As_2S_3$, or $Sb_2S_3$ on each face, overlapping at the edges 3.

Figure 2:
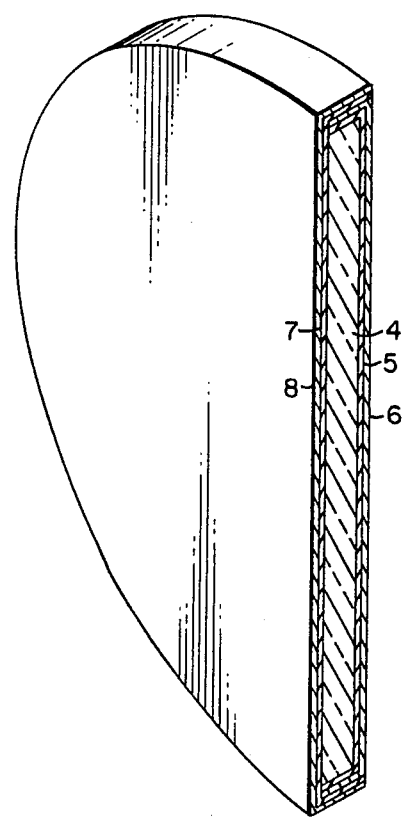
FIG. 2 is a sectional isometric view of a certain presently preferred embodiment of a laser window according to this invention.

In FIG. 2 a disk 4 of single-crystal alkalimetal halide has a layer 5 of $As_2S_3$ or $Sb_2S_3$ on one face and the edges which layer is overcoated with a coating 6 of $CaF_2$ or $MgF_2$ on the same face and edges. On the opposite face and, overlapping on the edges is a layer 7 of $As_2S_3$ or $Sb_2S_3$ overcoated with coating 8 of $CaF_2$ or $MgF_2$.

The alkali-metal halide is preferably sodium chloride as it has low optical absorption at 10.6 $\mu$m, but potassium chloride or other alkali-metal halides could also be used as they all have low absorption at about 10 $\mu$m. The alkali-metal halide substrate is typically a disk, about 1 to about 1½ inches in diameter, but may have any other shape or size, including non-parallel faces for use as a lens. It should be only as thick as is needed for mechanical strength, about 3 to 5 mm. being typical.

The anti-reflective coating of $CaF_2$ or $MgF_2$ is polycrystalline and is preferably applied to both faces of the alkali-metal halide substrate for complete moisture protection and maximum transmission. $MgF_2$ is preferably used at laser wavelengths of about 0.4 to about 5 $\mu$m if no layer of $As_2S_3$ or $Sb_2S_3$ is present and at laser wavelengths of about 0.7 to about 5 $\mu$m if a layer of $As_2S_3$ or $Sb_2S_3$ is present. Below about 0.4 $\mu$m $MgF_2$ becomes too absorbing, and above the thickness required for a quarter wavelength at 5 $\mu$m the coating tends to peel off. $CaF_2$ causes higher than acceptable reflection losses below laser wavelengths of about 5 $\mu$m and absorbs too much above about 11 $\mu$m and therefore is preferably not used outside of that range.

In order to maximize transmission the optical thickness (optical thickness = refractive index times true thickness) of the layer of $CaF_2$ or $MgF_2$ is an odd multiple of a quarter wavelength (i.e., ¼, ¾, etc.), and is preferably one quarter since greater thicknesses are unnecessary and only absorb more light.

The layer of $As_2S_3$ or $Sb_2S_3$ is of a vitreous structure. It increases the adherence of the layer of $CaF_2$ to the alkali-metal halide and acts as an additional moisture barrier. It may also be used without the layer of $CaF_2$ or $MgF_2$ to act as a moisture barrier, but it is not anti-reflective. This layer is preferably $As_2S_3$ as it is easier to work with and less poisonous. This layer should be about a multiple of a half wavelength (½, 1, etc.) in optical thickness in order to minimize reflection losses. It is preferably about one-half wavelength in optical thickness as greater thicknesses are unnecessary and decrease transmission.

In making the window the alkali-metal halide plate is thoroughly dried. If an intermediate layer is desired, $As_2S_3$ or $Sb_2S_3$ is vacuum deposited on the plate. Then $CaF_2$ or $MgF_2$ is vacuum deposited. The plate is turned over and the vacuum deposition of the layer or layers is repeated. The thickness of the layers is carefully monitored during deposition. The following example further illustrates the preparation of the laser windows of this invention.

EXAMPLE

A disk of single-crystal sodium chloride 1½ inches in diameter and 5 mm. thick was placed flat on one face in a bell jar along with $As_2S_3$ (refractive index = 2.38 at 10 $\mu$m) in an electrically-heated molybdenum boat and $CaF_2$ (refractive index = 1.282 at 10 $\mu$m) in an electrically-heated tungsten boat. The $As_2S_3$ and the $CaF_2$ were enclosed in compartments having shutters on top.

The pressure inside the bell jar was reduced to 5 × $10^{-6}$ torr and the sodium chloride disk was heated to 350°C with radiant heat for 1 hour. Argon was admitted to the bell jar until the pressure reached 7.5 × $10^{-2}$ torr. Aluminum electrodes in the jar about 2 inches apart and 6 inches from the disk were charged with 2.6 kilovolts for 5 minutes which bombarded the sodium chloride disk with argon ions to remove any last traces of moisture. The pressure was then reduced to about 5 × $10^{-6}$ torr.

The $As_2S_3$ was heated until it melted. The shutter was opened to permit the $As_2S_3$ vapor to escape and deposit on the NaCl. The thickness of the deposit was monitored with a quartz crystal oscillator. Since the window was to be used at 10.6 $\mu$m the shutter was closed after about 2 minutes when the layer reached a true thickness of 2.3 μm.

The CaF₂ was then melted, the shutter opened, and a deposit of 2.1 μm was permitted to accumulate before the shutter was closed again after about a minute.

The vacuum was broken and the window was tested in an infrared spectrometer. The peak transmission occurred at 10.6 μm. The normal transmission from a sodium chloride window at 10.6 μm is 93 percent. The above-prepared disk, which had only one side coated, had a transmission of 96.5 percent. After over 3 months of exposure to the atmosphere the coatings showed no sign of moisture attack or or reduced adherence.

Normally, the disk would be coated on both sides. This is done by breaking the vacuum, turning the disk over, and repeating the procedure beginning with the drying of the NaCl surface. The above disk, coated on both sides, is expected to have a transmission in excess of 99 percent.

I claim:

1. An optical component having two faces and a circumferential edge for use at a particular wavelength comprising:
    A. a substrate of a single-crystal alkalimetal halide; and
    B. a first continuous coating on one of said faces and on said edge, and a second continuous coating on said other face and overlapping said first continuous coating on said edge, said coatings being selected from the group consisting of $CaF_2$ and $MgF_2$ coatings about an odd multiple of a quarter of said wavelength in optical thickness and $As_2S_3$ and $Sb_2S_3$ coatings about a multiple of a half of said wavelength in optical thickness.

2. An optical component according to claim 1 wherein said wavelength is about 5 μm to about 11 μm.

3. An optical component according to claim 1 wherein said alkali-metal halide is sodium chloride.

4. An optical component according to claim 1 wherein said substrate is a disk about 1 to about 1½ inches in diameter and about 3 to about 5 mm. thick.

5. An optical component according to claim 1 wherein the form of a lens.

6. An optical component according to claim 1 in the form of a laser window.

7. An optical component according to claim 1 wherein said coating is a layer of $CaF_2$ about an odd multiple of a quarter of said wavelength in optical thickness.

8. An optical component according to claim 1 wherein said coating is a layer of $As_2S_3$ about a multiple of a half of said wavelength in optical thickness coated with a layer selected from the group consisting of $CaF_2$ and $MgF_2$ about an odd multiple of a quarter of said wavelength in optical thickness.

9. An optical component according to claim 8 wherein said layer of $As_2S_3$ is coated with a layer of $CaF_2$.

10. An optical component according to claim 1 wherein said coating is a layer of $Sb_2S_3$ about a multiple of a half of said wavelength in optical thickness coated with a layer selected from the group consisting of $CaF_2$ and $MgF_2$ about an odd multiple of a quarter of said wavelength in optical thickness.

11. An optical component according to claim 10 wherein said layer of $Sb_2S_3$ is coated with a layer of $CaF_2$.

12. An optical component according to claim 1 wherein said multiple is one.

13. An optical component according to claim 1 wherein said first and second coatings are the same.

* * * * *